(12) United States Patent
Doman et al.

(10) Patent No.: US 10,384,780 B1
(45) Date of Patent: Aug. 20, 2019

(54) APPARATUS AND METHOD FOR PRECISION BALLISTIC AIRDROP

(71) Applicant: Government of the United States, as represented by the Secretary of the Air Force, Wright-Patterson AFB, OH (US)

(72) Inventors: David B Doman, Springfield, OH (US); Adam R. Gerlach, New Bremen, OH (US); Josiah T. Vandermey, Atlanta, GA (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 150 days.

(21) Appl. No.: 15/664,469

(22) Filed: Jul. 31, 2017

Related U.S. Application Data

(60) Provisional application No. 62/371,957, filed on Aug. 8, 2016.

(51) Int. Cl.
*G06F 19/00* (2018.01)
*B64D 1/12* (2006.01)

(52) U.S. Cl.
CPC ..................... *B64D 1/12* (2013.01)

(58) Field of Classification Search
CPC ........................................................ B64D 1/12
USPC ......... 235/401, 404, 400, 407, 417; 244/152
See application file for complete search history.

(56) References Cited

U.S. PATENT DOCUMENTS

| | | | |
|---|---|---|---|
| 8,538,605 B1* | 9/2013 | Riley | F42B 10/64 244/3.1 |
| 2003/0197095 A1* | 10/2003 | Preston | B64D 1/14 244/152 |
| 2006/0032984 A1* | 2/2006 | Preston | G07F 17/32 244/152 |

OTHER PUBLICATIONS

Gerlach et al., Analytical Solution for Optimal Drogue-to-Main Parachute Transition Altitude for Precision Ballistic Airdrops.
Vandermey et al., Release Point Determination and Dispersion Reduction for Ballistic Airdrops, AIAA SciTech, Jan. 2016, San Diego, CA.
Vandermey et al., Release Point Determination and Dispersion Reduction for Ballistic Airdrops, Journal of Guidance, Control and Dynamics, vol. 38, No. 11, Nov. 2015.

(Continued)

*Primary Examiner* — Karl D Frech
(74) *Attorney, Agent, or Firm* — AFMCLO/JAZ; Timothy Barlow

(57) ABSTRACT

Precision ballistic airdrop of packages from an aircraft comprises entering the estimated wind field in the drop zone into a CPU aboard the packages; computing a transition altitude for each of the packages based on the wind field and the order in which each package is released, each package having a predetermined release order; programming the computed transition altitude into each of the packages; releasing each of the packages in the predetermined order; comparing a pressure altitude to the transition altitude in the CPU of each package; jettisoning the drogue chute and deploying the main chute for each of the packages when the pressure altitude is less than or equal to the transition altitude; and descending each of the packages under its main chute, wherein the wind field affects the flight of some of the packages more than others based on the selection of the transition altitude for each package.

11 Claims, 5 Drawing Sheets

(56) References Cited

OTHER PUBLICATIONS

Gerlach et al., Wind Field Estimation From Airdrop Trajectory Measurements, AIAA SciTech, Jan. 2016, San Diego, CA.
Johnson, J., Hardware Integration of Parachute Guidance, Navigation, and Control for the Affordable Guided Airdrop System (AGAS), U.S. Naval Postgraduate School, Sep. 2001.
Carrabba, P.L., The Right Place at the Right Time, Air Force Institute of Technology, Wright-Patterson AFB, OH, Apr. 2004.
Benney et al., NATO Precision Aidrop initiatives and modeling and Simulation Needs, Oct. 2006.
Air Force Instruction 11-2C-17, Nov. 2011.
Air Force instruction 11-231, Jul. 1998.
Hattis, et al., Provising Means for Precision Airdrop Delivery from High Altitude, AIAA Guidance, Navigation and Control Conference and Exhibit, Aug. 2006, Keystone, CO.
Benney, et al., The New Military Applications of Precision Airdrop Systems, AIAA, Sep. 2005, Arlington, VA.

* cited by examiner

APPARATUS AND METHOD FOR PRECISION BALLISTIC AIRDROP

CROSS-REFERENCE TO RELATED APPLICATIONS

This application claims the benefit of U.S. Provisional Patent Application No. 62/371,957 filed on 8 Aug. 2016, the contents of which, in its entirety, is herein incorporated by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to ballistic airdrop and, more particularly, to apparatuses and methods for precision airdrop.

BACKGROUND OF THE INVENTION

There are three main categories of airdrop today. For highly critical package delivery, the JPADS guided parafoil system is an option that can be employed. Once released from an aircraft these parafoils continuously compensate for the effects of release point error and wind variations using a closed loop feedback control system that translates position errors into actuator commands that continuously vary the aerodynamic characteristics of the parafoil in order to steer the package towards the desired point of impact. While quite effective, these systems are expensive to procure (approximate cost is $36K per unit). Furthermore, because of their high cost, ground personnel are under pressure to retrieve the units for reuse. At the other end of the spectrum, traditional ballistic airdrop is used to deliver the bulk of airdropped packages at a very low cost. Low altitude release is often used when attempting to deliver packages with a high degree of precision and accuracy. Low altitude drops can expose aircraft and crew to risks from enemy fire and terrain; therefore, high-altitude drops are preferred from the standpoint of air safety. High-altitude low-opening drops typically result in lower precision and accuracy than the alternatives described above because uncertainties, drop errors, and winds act upon the dynamics of the system over a longer period of time without any means of correcting for their effects after release from the aircraft. The accuracy of HALO drops is governed by the accuracy of the computed air release point (CARP), how closely the pilot and crew are able to release the packages to the CARP, the accuracy of the dynamic models of the chutes and packages, and the accuracy of the wind field estimate. Most airdrops involve the release of multiple packages. Because of differences in the exit time of each package from the aircraft, and the high speed of the aircraft, the packages typically are dispersed along the ground track of the aircraft prior to stabilizing under the drogue chutes. Furthermore, standard practice is to set the drogue to main chute transition altitudes of all of the packages in a multi-package drop equal to one another. In the presence of no wind and no uncertainties, the ground impact pattern of the packages will closely resemble the dispersion pattern of the packages that existed when the packages first stabilized under their drogue chutes. Thus, the current practice for ballistic HALO drops is completely open loop with no means of reducing unavoidable impact dispersion resulting from differences in release times, and includes no means for compensating for the effects of drop errors, uncertainties, and disturbances.

Summary of advantages and disadvantages of guided parafoils:

Advantages: accurate.

Disadvantages: expensive, high-complexity, pressure to recover hardware exposes ground personnel to danger Summary of advantages and disadvantages of conventional ballistic airdrop:

Advantages: Low cost, low complexity, well-established procedures

Disadvantages: low accuracy, improving accuracy exposes aircraft and crew to danger

SUMMARY OF THE INVENTION

The present invention overcomes the foregoing problems and other shortcomings, drawbacks, and challenges of minimizing package dispersion during airdrop, and thereby minimizing the time to recover the packages. While the invention will be described in connection with certain embodiments, it will be understood that the invention is not limited to these embodiments. To the contrary, this invention includes all alternatives, modifications, and equivalents as may be included within the spirit and scope of the present invention.

The invention fills the void between expensive continuously-guided parafoils and purely ballistic drogues and chutes. Furthermore, depending upon the degree of accuracy and compensation desired, its implementation can be scaled from a no cost solution that requires a small change to pre-flight planning, to a low cost solution that uses GPS to determine the current position of each package, an embedded microcomputer, and the current estimate of the wind field to continuously compute the optimal drogue-to-main chute transition altitude that optimizes some performance criteria. Examples of possible performance criteria include: minimization of impact error, multi-package impact dispersion minimization, distribution of packages to points closest to a road network, maximum dispersion area for leaflets and humanitarian supplies, distribution along a route with minimal risk and maximum reward, distribution to minimize time/effort for recovery, or some weighted combination of these examples. A person or computer may direct new performance criteria at any time in the airdrop process.

The invention addresses the problem of achieving a high degree of accuracy and precision when using high-altitude low-opening ballistic drogues and parachutes to deliver unguided airdropped packages to desired locations on the ground. This is done by choosing a release heading that balances minimization of the initial dispersion along a ground track and maximizes the potential effect of the forecast or measured wind field to affect the trajectory of a package along a desired direction due to differences between the aerodynamic characteristics of the drogue and main parachutes. Through the timing of a single control event, the effect of position errors accumulated from package release through drogue descent can be minimized. The control event occurs when a package jettisons the drogue chute and transitions to fall under the main chute. Wind affects the drogue chute and main chute differently; this difference may be exploited to adjust the impact location of each of the packages. The approach used by this invention is far less expensive than using guided parafoils and requires minimal changes to existing high-altitude low-opening (HALO) airdrop procedures. Currently HALO drops have the advantage of reducing the exposure of aircraft and crew to ground threats; however, the delivery of packages to desired impact locations on the ground is reduced when compared to low altitude airdrops because the effects of wind disturbances, uncertainties, and release point errors accumulate over a longer period of time. This invention fills a void in the airdrop spectrum that ranges from expensive highly accurate guided parafoils to low cost ballistic HALO mechanisms that have limited accuracy. In 2011, the USAF dropped more than 6M lb. of cargo per month. The invention offers cost effective improvements in delivery accuracy while reducing risk to aircraft and crew.

The difference in each package's wind response under its drogue and main parachutes may be used to select main parachute deployment altitudes for each of the packages that optimizes at least some performance criteria, e.g. reduces each of their miss distances from the target point. This optimization, combined with the selection of a CARP point and aircraft heading, maximizes the improvement in the selected performance criteria. As updated wind information is received on the aircraft, the optimal CARP, aircraft heading, and main parachute deployment altitudes for each of the packages may be continually updated. At a certain distance or time from the planned CARP, the pilot must commit to a particular aircraft heading for the drop; last minute heading changes will not be feasible. At this point, the optimization problem becomes constrained to finding the best CARP along the selected heading. Once the final CARP is determined, the optimization changes from a multi-variable optimization of all package deployment altitudes to a series of single variable optimizations for each individual package with the goal of minimizing miss distance from the intended target point. Initial conditions for each package may be obtained from the aircraft state estimates at the time of the drop. If a wireless connection is used to set the programmed deployment altitude, the opening altitude may be updated after the packages have left the aircraft, in order to incorporate the most accurate initial conditions for the drop into the optimization solution.

According to one embodiment of the present invention, a method for precision ballistic airdrop of a plurality of packages from an aircraft comprises: a) estimating a wind field in a drop zone; b) computing an optimal transition altitude for each package based on the estimated wind field and the order in which each package is released, the transition altitude being the altitude where a drogue chute is jettisoned and a main chute is deployed, each of the plurality of packages having a predetermined release order; c) choosing a release heading for the aircraft to minimize an initial dispersion of the plurality of packages and to maximize the effect of the wind field to affect the trajectories of the plurality of packages and to adjust for dispersion errors; d) programming the computed transition altitude into each package; e) releasing the plurality of packages in the predetermined release order; f) comparing a pressure altitude to the transition altitude in each package; g) jettisoning the drogue chute and deploying the main chute for each package when its pressure altitude is less than or equal to its transition altitude; h) descending each package under its main chute. The effect of this method is that the wind field affects the flight of some of the packages more than others based on the selection of the transition altitude for each package, reducing package dispersion and making it easier to recover the plurality of packages and their associated equipment. The particular transition altitude for each of the plurality of packages is selected to give each package a unique descent profile, based upon the wind field information and the particular performance characteristics of the drogue chute and main chute for each package.

According to one variation, the method for precision ballistic airdrop of a plurality of packages from an aircraft further comprises distributing package contents among each of the packages to achieve maximum uniformity in descent rate. The distribution of package contents may be made by weight, volume, drag performance or other characteristics in order to achieve maximum uniformity in the descent rate characteristics of the bundle of packages, which leads to a more simple determination of the discrete transition altitudes for the packages.

According to another variation, the method for precision ballistic airdrop of a plurality of packages from an aircraft further comprises collecting package position information over time with a GPS unit onboard each package which is in communication with a CPU on board each package; and computing the transition altitude that optimizes some performance criteria. This provides the advantage of a real-time update of the transition altitude based on the measured location of the bundle.

According to a further variation, the method for precision ballistic airdrop of a plurality of packages from an aircraft further comprises collecting pressure altitude information over time with a pressure altimeter onboard each package and in communication with each onboard CPU; comparing the pressure altitude information to the computed transition altitude for each package. This arrangement provides the advantage of an accurate execution of the transition altitude for each package because each package independently determines when it arrives at its transition altitude, and reduces the dispersion of packages.

According to another variation, the method for precision ballistic airdrop of a plurality of packages from an aircraft further comprises receiving wind field information from one or more external sources, e.g. wirelessly, in the CPU in each package through a radio receiver on each package; re-computing the transition altitude for each package based on the received wind field information. This arrangement provides a real-time update of the wind field information for maximum reduction of package dispersion.

According to a further variation, the method for precision ballistic airdrop of a plurality of packages from an aircraft, further comprises deriving wind field information in each CPU from GPS trajectory measurements. This provides the advantage of a real-time update of the wind field in order to provide the greatest reduction in the dispersion of the packages.

According to another variation, the method for precision ballistic airdrop of a plurality of packages from an aircraft further comprises receiving wind field information from at least one of a lower package or a ground-based wind field information source. This provides the advantage of a real-time update of the wind field in order to provide the greatest reduction in the dispersion of the packages or the greatest optimization of the selected performance criteria.

According to a further variation, the method for precision ballistic airdrop of a plurality of packages from an aircraft further comprises re-computing the transition altitude for each package with the derived wind field information. This provides the advantage of a real-time update of the transition altitudes based on the latest wind field information in order to provide the greatest reduction in the dispersion of the packages or the greatest optimization of the selected performance criteria.

According to another variation, the method for precision ballistic airdrop of a plurality of packages from an aircraft further comprises re-computing the transition altitude for each package with the received wind field information. This provides the advantage of a real-time update of the transition altitudes based on the latest wind field information in order to provide the greatest reduction in the dispersion of the packages or the greatest optimization of the selected performance criteria.

According to a further variation, the method for precision ballistic airdrop of a plurality of packages from an aircraft further comprises calculating the transition altitude for each package based on at least one of the calculated and measured performance characteristics of the drogue chute and the main chute. Both drogue chutes and main chutes have a range of drag areas, even when manufactured to the same standards. These variations have a real-world impact on the descent profiles of the drogue chutes, main chutes, and the packages. The variations may be associated with the unique identification number or serial number for each chute. The determination of the performance characteristics of the chutes may be factored into the transition altitude computations for each individual package to minimize package dispersion or to optimize the selected performance criteria.

According to another embodiment, an apparatus for precision ballistic airdrop of a plurality of packages from an aircraft is disclosed, each package having a transition altitude, and each package comprising: a pressure altimeter in communication with the CPU, the pressure altimeter communicating a pressure altitude to the CPU, the CPU for receiving and storing wind field information and computing a transition altitude (when to release a drogue chute and deploy a main chute at the transition altitude) for each package based upon input wind field estimates, the CPU comparing the transition altitude to the pressure altitude; the drogue chute for an initial descent of the package; an actuator controlled by the CPU for jettisoning the drogue chute and deploying the main chute at the transition altitude; the main chute for final descent of the package. This apparatus makes it possible to place packages much more closely together than prior art systems, even without precision guidance hardware. The transition altitude may be a unique altitude for each individual package in order to give each package a unique descent profile.

According to a first variation, the apparatus for precision ballistic airdrop further comprises a radio receiver for receiving updated wind field information for re-computing the transition altitude, the updated wind field information from at least one of a lower package and an external, e.g. ground-based, wind field information source. This provides the advantage of a real-time update of the transition altitudes based on the latest wind field information in order to provide the greatest reduction in the dispersion of the packages. The CPU of each of the plurality of packages may receive wind field information from one or more of the plurality of packages, if one or more of the packages are equipped to derive such information, e.g. with a GPS receiver. The first package to descend may include the ability to derive wind field information, i.e. an optimized transition altitude reference bundle, in order to provide timely information, i.e. wirelessly, to the following packages. Based on the timely wind field information, the transition altitude for each package may be computed and periodically recomputed during descent in order to optimize the descent profile of each package.

According to another variation, the apparatus for precision ballistic airdrop further comprises a radio transmitter for transmitting the derived wind field information to higher packages. This arrangement makes it possible for real-time wind field information to be derived and delivered during the airdrop in order to make adjustments to the transition altitudes for each of the higher packages in order to minimize dispersion of the packages.

According to a further variation, the drogue chute has a smaller drag area than the main chute. This arrangement makes it possible to rely on the longer, slower descent under the main chute for maximizing the influence of the wind field and reducing the dispersion of the packages.

According to another variation, the drogue chute and the main chute have at least one of calculated performance characteristics and measured performance characteristics for use in calculating the transition altitudes. Such data is recorded and associated with its respective chute in a database that can be updated after each drop in order to have accurate performance characteristics for use in calculating the transition altitude for each package.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
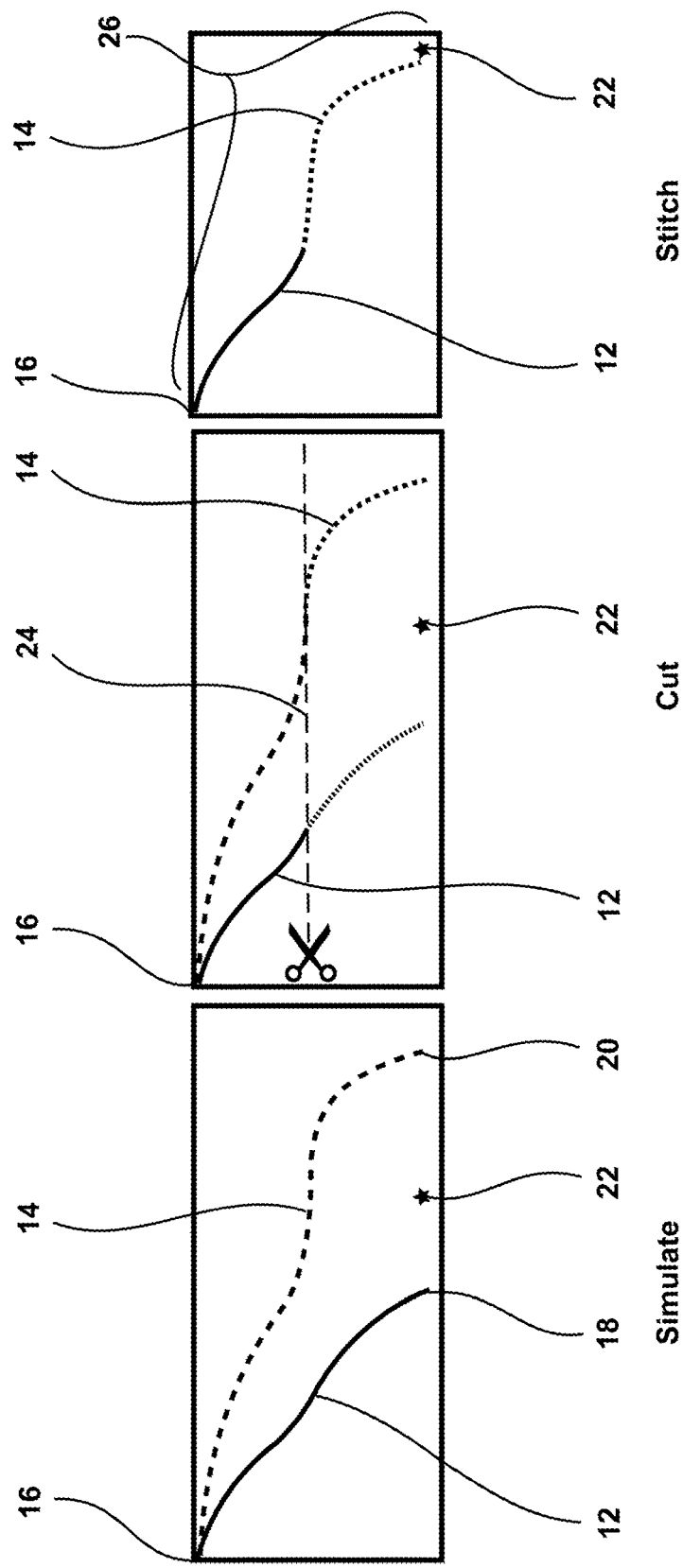
FIGS. 1A-1C depict the selection of the optimal point at which the drogue trajectory is stitched to the main chute trajectory to achieve a feasible desired impact point, according to an embodiment of the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The implementation of the method and the associated apparatus in its most complete form will be described. Nevertheless, the implementation is scalable in that a no-cost hardware solution is possible; however, such an implementation will be less robust to uncertainties and disturbances.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

A typical CDS (container delivery system) airdrop includes multiple packages arranged in columns along an aircraft's cargo deck. The collection of packages in the aircraft will be referred to as the CDS "stick." C-130 aircraft can carry up to 16 packages, while C-17 airdrops can consist of up to 40 individual packages. Individual packages are restrained in the aircraft by a gate and a series of securing straps. Once a CARP (computed air release point) is computed, the aircraft is flown to the appropriate location along a defined heading and the release sequence is initiated. During the release, the pilot attempts to maintain a constant aircraft pitch angle while the package restraints are released and the stick is accelerated by gravity along the cargo ramp. As each package exits the aircraft, a small drogue parachute is released into the air stream that serves to slow and stabilize the package during the high altitude portion of the descent. According to the prior art, when a preset altitude is reached or a preset timer expires, the main parachute is released and begins its inflation process. The package then continues to the ground under the main parachute.

During the main parachute inflation phase, the descent rate rapidly increases when the drogue parachute drag force is removed and before the main chute has inflated sufficiently to compensate. As the main parachute inflates, the descent begins to slow. The descent deceleration continues beyond the quasi-steady descent rate of the main parachute due to the inclusion of additional apparent air mass.

The effect of wind on a drogue chute is less pronounced than the effect of wind on a large main parachute. FIG. 1A shows a notional diagram of the drogue chute trajectory 12 from the release point 16 to the ground 18. FIG. 1A also shows a diagram of the main chute trajectory 14 from the release point 16 to the ground 20. Notice that the release point 16 is the same for the drogue chute and the main chute but that the trajectories to the ground 12, 14 are quite different due to the different drag characteristics of the drogue chute and main chute. For a given wind field, the horizontal movement of a package under a main chute is an amplified version of the movement of a package falling under a drogue chute, as illustrated in FIG. 1A. This is because the lower descent rate of the package under the main chute allows winds at a given altitude to act longer on the package, which causes it to drift further than it would have by falling at a faster descent rate under a drogue chute. The method underlying this invention solves the problem of deciding the altitude at which the drogue chute should be jettisoned so that the package falls under the influence of the main chute, such that some performance criteria is optimized. The method takes advantage of the difference between the horizontal drift rates that occur between the drogue chute and main chute in order to reduce impact errors and multi-package impact dispersion distances. The timing of a single control event for each package allows the impact point of each to be varied along a one-dimensional (1D) curve, i.e. a parameterized curve defined by a single variable, that defines the set of all possible impact points along the ground. The point on this 1D curve that is closest to the desired impact point can be mapped to a corresponding transition altitude. Thus, the potential of the wind field can be utilized to compensate for release point errors and dispersions and for un-modeled wind effects encountered while the package falls under a drogue. As illustrated in FIG. 1A, neither the drogue chute trajectory 12 nor the main chute trajectory 14 intersect the desired impact point 22 on the ground. However, as illustrated in FIG. 1B, an upper portion of the drogue chute trajectory 12 may be combined with a lower portion of the main chute trajectory 14 to deliver an individual package to the desired impact point 22. The vertical position where the upper portion of the drogue chute trajectory 12 is combined with the lower portion of the main chute trajectory 14 corresponds to the transition altitude 24 for that particular package. FIG. 1C illustrates the integrated descent trajectory 26 of the upper portion of the drogue chute trajectory 12 and the lower portion of the main chute trajectory 14 to delivery an individual package to the desired impact point 22.

Figure 2:
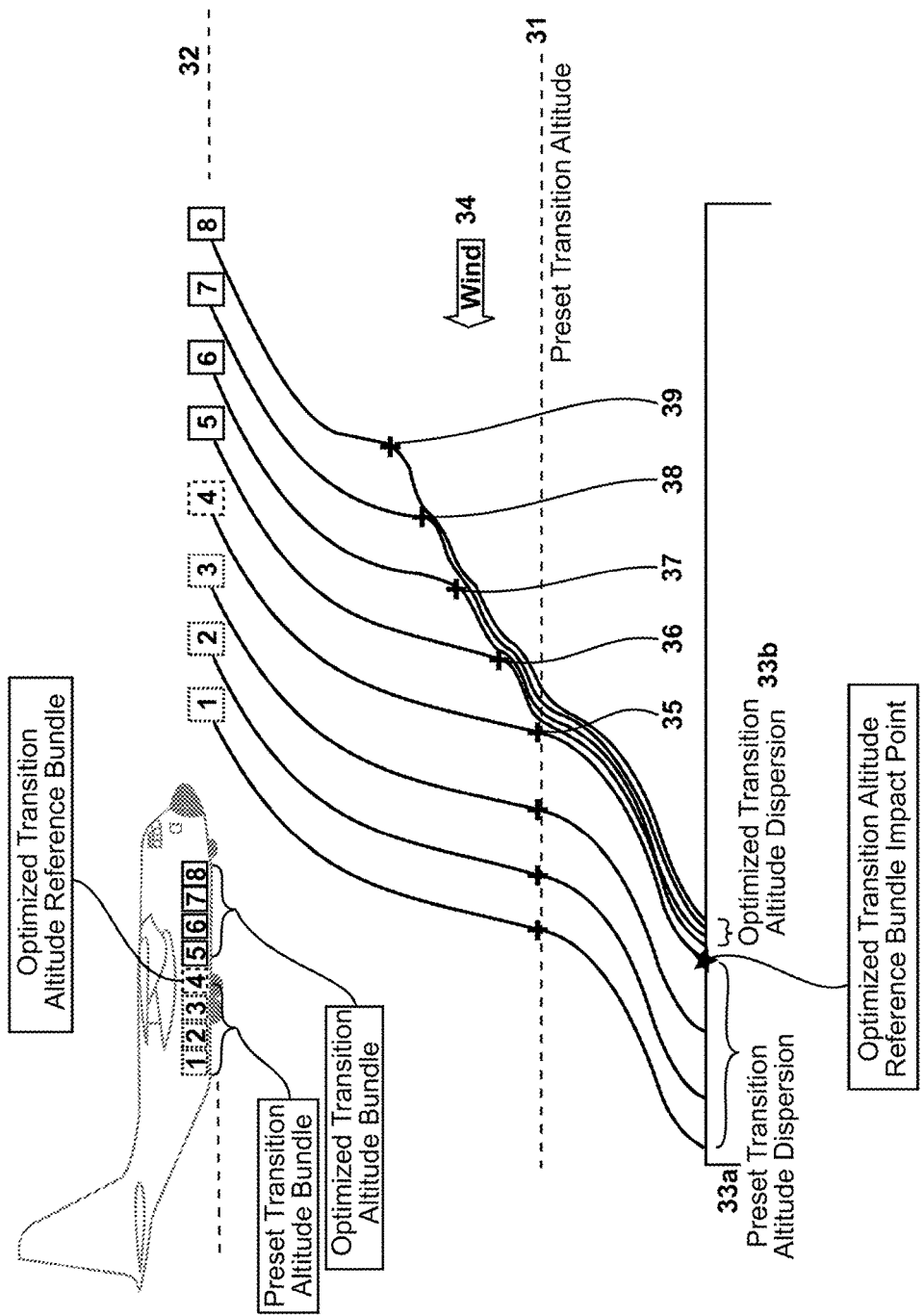
FIG. 2 depicts a diagram of the effect of fixed, preset transition altitudes and offset, optimized transition altitude trajectories for a multi-package drop and the corresponding impact dispersion, according to an embodiment of the invention.

FIG. 2 illustrates how the dispersion of a plurality of (eight) packages at a given release altitude 32 may be reduced by allowing the wind 34 to affect the flight of some packages, i.e. packages 5-8, more than others, i.e. packages 1-4, by intelligent choice of transition altitude 36-39. Note that while falling under the influence of a drogue chute or main chute of equal drag-area, the package trajectories for all packages 1-8 are generally parallel to one another; using the prior art approach of setting all transitions altitudes equal to one another, i.e. a preset transition altitude 31, the impact dispersions 33a cannot be reduced. This condition is represented by packages 1-4 of FIG. 2.

In order to solve the problem, the dynamics of the ballistic drogues, main parachutes, and packages are modeled in the form of ordinary differential equations. A wind field 34 is an exogenous input to these equations. For a given forecast or measured wind field 34 the equations can be solved either analytically or numerically in order to generate estimates of trajectories connecting release points to the ground, i.e. impact dispersions 33a, 33b, as represented in FIG. 2 with packages 1-8. For a given performance criterion, the optimal drogue-to-main parachute transition point 36-39 for each package 5-8 is computed to result in an optimized impact dispersion 33b. This may be accomplished analytically by setting the derivative of the performance index with respect to transition altitude equal to zero and solving for the optimal transition altitude. Alternatively, it may be found numerically by computing the performance index over a range of altitudes and finding the transition altitude that yields the smallest performance index. Algorithms may be used to solve the problem both analytically and numerically; the analytical results allow the results to be generated 5000× faster than the numerical approach. The analytical implementation is suitable for real time implementation on low cost embedded hardware that can be released with each package.

Figure 3:
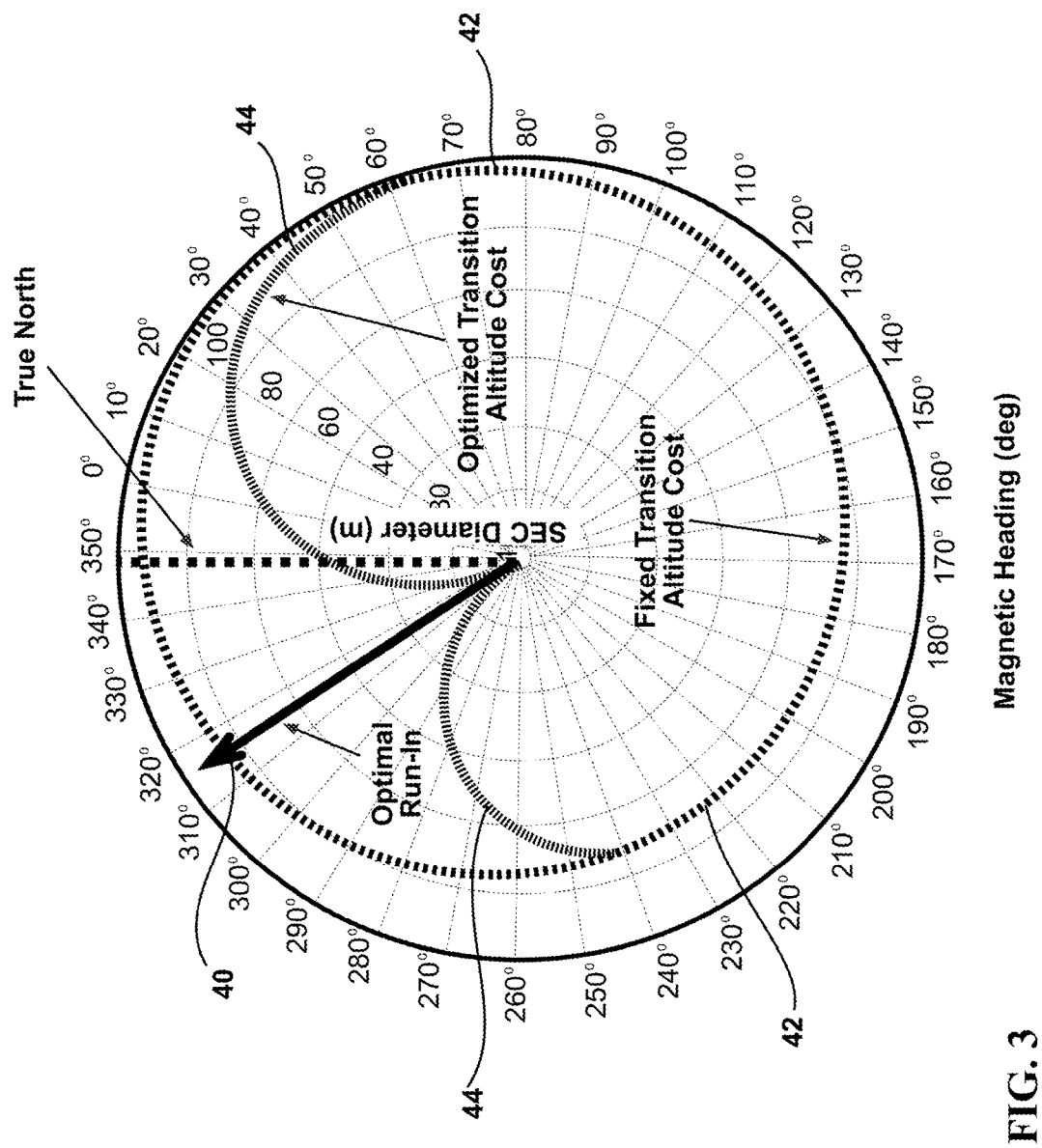
FIG. 3 depicts a smallest encompassing circle as a function of release heading for a group of eight packages for an example measured wind field at Yuma Proving Ground: the inner circle corresponds to equal altitude transition points; the two curves emanating from the center correspond to optimized transition points, according to an embodiment of the invention.

The selection of the approach heading 40 for the aircraft may be selected to maximize the potential for the wind to adjust for dispersion errors in a desired way. Heading selection is a key element of the approach. FIG. 3 shows the magnitude of a smallest encompassing circle for a multi-package drop that is based upon a sample of measured winds at Yuma Proving Ground as a function of aircraft heading at release. The inner circle 42 represents the diameter that encompasses the impact points of all packages if the transition altitudes are uniformly selected as they are in the prior art procedure. The two curves 44 extending from the center of the chart represents the diameter of the circle that encompasses the set of the impact points for all packages if the transition altitudes are selected to yield the smallest encompassing circle for each possible release heading. The smallest encompassing circle is a derived measurement from the impact location of the eight packages. The smallest encompassing circle may be considered as the distance between the impact locations of the two bundles furthest away from each other. It can be seen that considerable reduction in impact dispersions can be achieved by selecting both heading and transition altitudes using the new procedure. This illustrates the potential of the method to decrease impact dispersions for multi-package drops simply by changing existing procedures and without the addition of new hardware. Nevertheless, robustness to uncertainties and disturbances may be improved by coupling the method with an apparatus that implements the inventive procedure onboard each package in real time to improve the accuracy of single-package and multi-package drops. Note that the two curves 44 (labeled 'optimized transition altitude cost' on either side of the 'optimal run-in') and inner circle 42 (labeled 'fixed transition altitude cost') are coincident over approximately 180 degrees of the release heading range. This is a result of a constraint that packages are not allowed to fall through one another, which means that the constrained optimal transition points in this range of headings is that all packages open at the same altitude.

Due to the significant potential for improved dispersion performance, standardizing the descent rate between packages in a multi-package bundle may be an effective strategy for improving performance. As a first step toward achieving descent rate uniformity, the contents of the packages in a multi-package bundle should be distributed between the packages to achieve the most consistency in package descent rate. Once the packages are built, additional descent rate variation can be accounted for by adding mass, e.g. ballast or payload, to lighter packages. With knowledge of each parachute's drag area, mass could be customized for each package to achieve the desired or descent rate. Water bladders could provide a low cost means of adding mass to packages. Altering the parachute aerodynamics or matching parachutes with packages based on the package masses and parachute drag areas could also reduce the variation in descent rates in a plurality of packages.

If one or more of the packages were equipped with a basic GPS sensor and a microcontroller capable of recomputing the parachute deployment altitude during its descent, the real-time GPS state information may be used to provide updated initial conditions for the parachute deployment optimization. The optimal deployment altitude may continue to be updated until the package reached the altitude of the most recent solution or a preset lower bound. This low cost solution allows for wind information to be used to help offset any errors in the drop up until the point when the main parachute is deployed.

Manner and Process of Making and Using the Invention

In order to maximize the potential of the invention to improve the accuracy and precision of ballistic airdrop, the method should be integrated into airdrop planning procedures and appropriate hardware should be included with each ballistic airdrop package.

Logistics
Maintain a database of drag-areas of main parachutes and record by serial number.
Use GPS, pressure altimeter data, and air density estimates from onboard sensor package to estimate drag-areas for each main chute after each drop.
Update database after each drop so that variation of main parachute performance is tracked with use.

Pre-Release Planning Procedure
Select from available main parachutes and query database to obtain most recent estimate drag-areas.
Based upon the drag-area estimates, load packages such that the quasi-steady descent rates of all packages are approximately equal.
Obtain forecast 4D wind data prior to takeoff
Select release altitude.
Run transition point optimization and select best feasible release heading and use for pre-flight planning.
Set the transition altitude on each package based upon pre-flight planning estimate.

Enroute to Release
Obtain most recent wind forecast or make a real-time wind measurement.
Run transition altitude optimization algorithm with most recent or real-time wind information.
Wirelessly update programmed transition altitudes onboard each package.

Release.

Descent
As soon as the packages are stabilized under their respective drogues, packages may periodically wirelessly communicate their positions to one another based upon their individual sensor measurements, if GPS equipment is aboard each package.
New wind measurements may be wirelessly communicated to descending packages for improved accuracy.
Wind estimates based upon the trajectories of lower altitude packages may be communicated to higher packages.
The transition altitude for each package may be periodically updated by running the transition altitude optimization algorithm onboard during descent under the drogue.
Actuator jettisons drogue and main parachute is deployed at most recent estimate of optimal transition altitude.
Packages descend under main parachute.
Upon landing, the drag-area is estimated for the main parachute and the serialized main parachute database is wirelessly updated for the next use.

Note that not all elements of the above procedure are necessary in order to achieve improved accuracy. Improvements may be made simply by changing procedures; however, the largest improvements will be achieved by implementing the algorithm onboard each package in hardware.

Hardware Implementation

Figure 4:
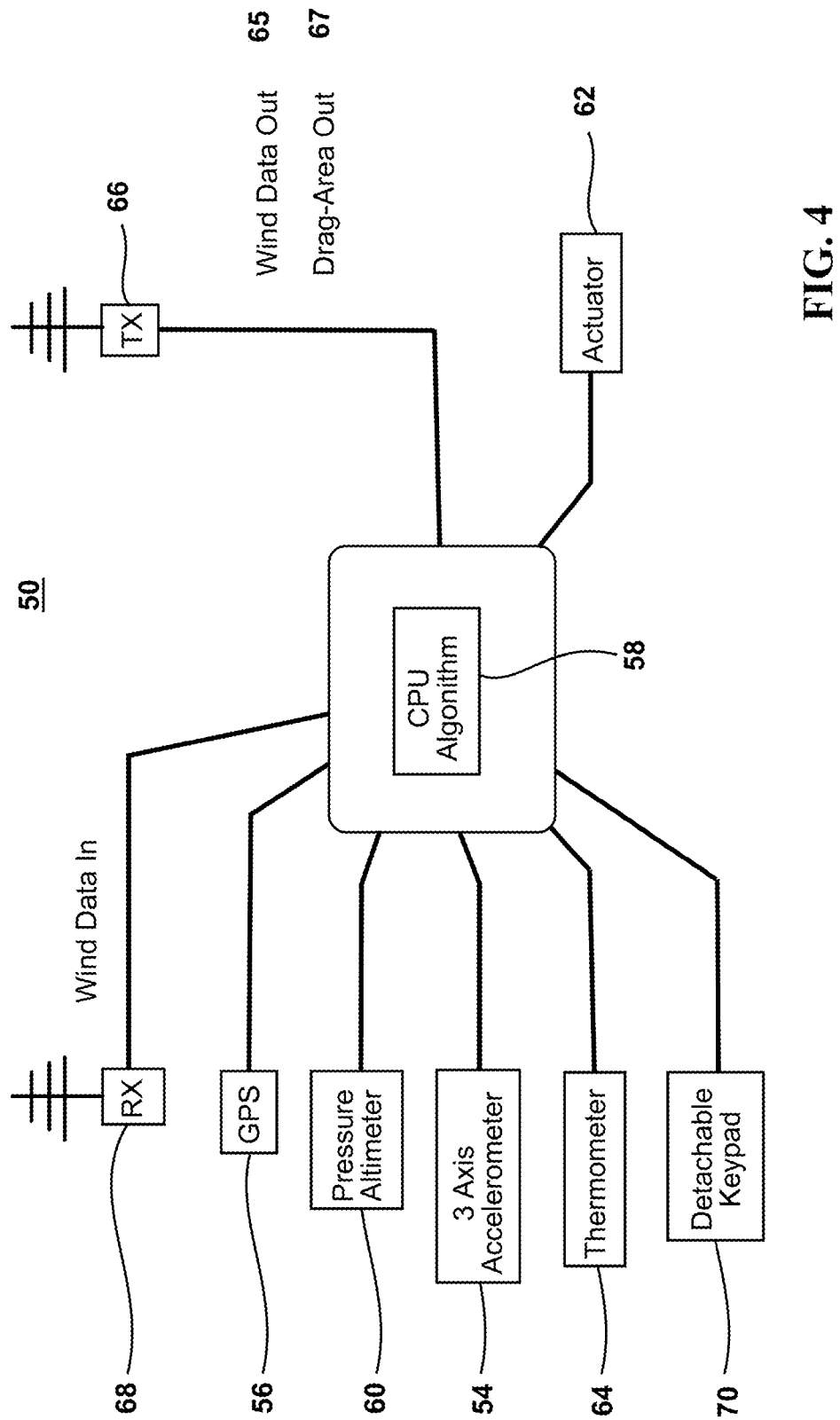
FIG. 4 depicts an apparatus for implementing ballistic transition altitude optimization, according to an embodiment of the invention.
Figure 5:
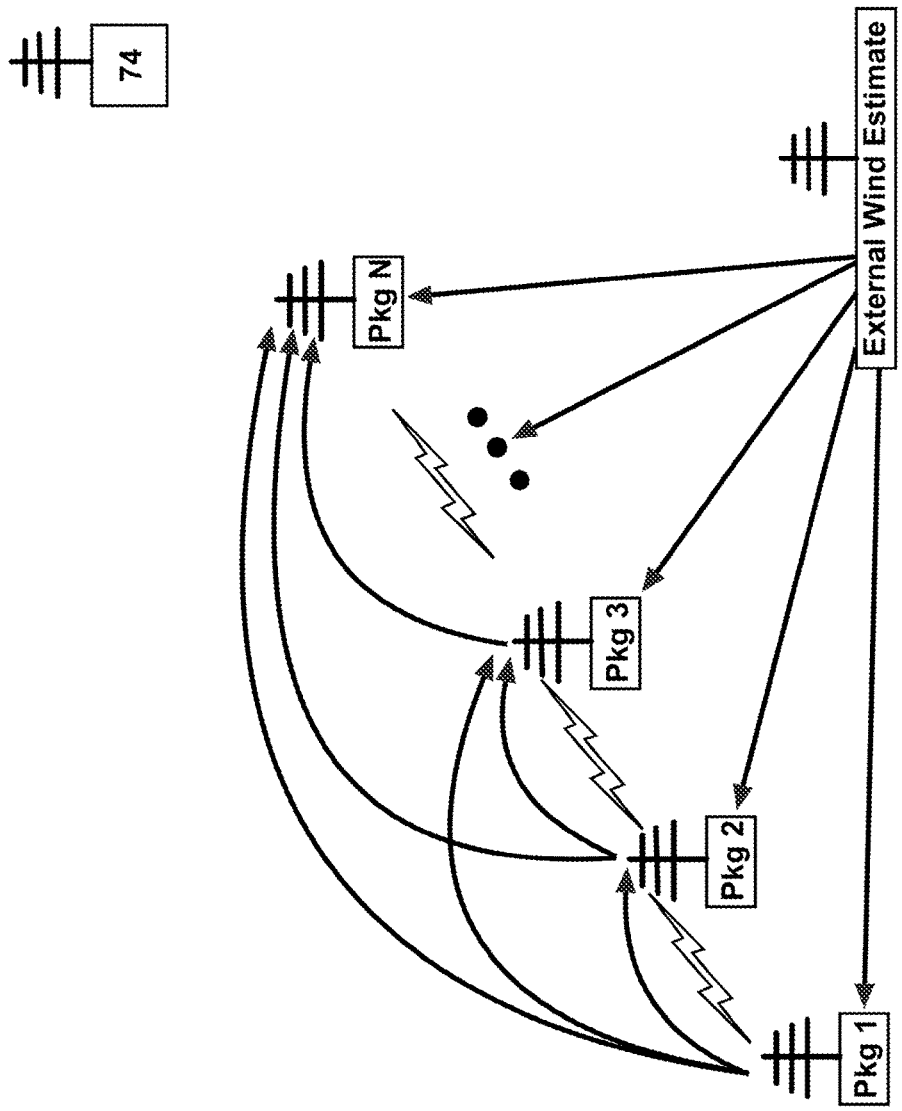
FIG. 5 depicts a communication arrangement between dropped packages, and between dropped packages and an external source of wind field information, according to an embodiment of the invention.

As illustrated in FIG. 4, the hardware 50 for improving the accuracy of ballistic airdrop may include several components. Signals from a 3-axis accelerometer 54 are processed by a CPU 52 to determine when a package has stabilized under a drogue parachute. A GPS receiver 56 may be used to estimate the position of each package and to periodically supply that estimate to the CPU 52 to execute a transition altitude optimization algorithm 58. A pressure altimeter 60 supplies pressure altitude measurements to the CPU 52. The CPU 52 compares the currently-measured pressure altitude to the most recent estimate of the optimal transition altitude and if the former is less than or equal to the latter, then the CPU 52 triggers an actuator 62 that causes the drogue to be jettisoned and the main parachute to deploy. As shown in FIG. 4, the CPU 52 aboard each package periodically queries an onboard radio receiver 68 that reads the most recent wind field estimates 65 available from packages below its current altitude and from sources external to the airdrop, e.g. person 72 or aircraft 74. In FIG. 5, package N is receiving wind field information from each of the packages below its altitude, as well as from an aircraft 74 and a person or equipment 72 near the drop zone (arrows to/from the packages and ground equipment 72/aircraft 74 are omitted for clarity). The separate wind field estimates are then fused to obtain a best estimate of the current wind field, which is used to periodically re-compute the optimal transition point. A radio transmitter 66 onboard each package is used to communicate wind field estimates that are based upon sensor measurements taken by lower packages to higher packages. The wind estimates used by higher packages thus contain fused wind field estimates that are based upon a blend or fusion of the observations obtained by lower packages and those obtained by sources outside of the set of descending packages. Blending or fusion may be accomplished by interpolation of the wind field estimates obtained from various sources. The weighting factor on each estimate composing the blend may be a function of the uncertainty, time, and location of observation, or measurement noise associated with each source.

A digital thermometer 64 supplies temperature measurements to the CPU 52. The combination of pressure and temperature measurements are used to compute the local air density that may be shared with other packages during descent. The air density estimates in conjunction with the quasi-steady descent rates are logged on onboard memory 52 and used to estimate the drag-area of the main parachute post-flight. The drag-area for a given parachute 67 is wirelessly transmitted (via transmitter 66) to update the serialized parachute database at a convenient time. The hardware 50 may include a detachable keypad 70 for programming the transition altitude for each package, or for accessing information within the CPU 52.

Alternatives

The invention improves the precision and accuracy of ballistic airdrop through a combination of logistical, procedural, and hardware changes when compared the prior art. Benefits are achieved by implementing the procedural aspects of the invention, which results in no-cost improvements. Nevertheless, in order to maximize improvements, the entire invention as described above should be implemented.

Fusion of wind data from multiple sources can be achieved using either a centralized or decentralized approach; however, the latter is more fault tolerant than the former. 'Centralized' or 'decentralized' is a reference to which bundle(s) will be doing the fusions. In a centralized arrangement, all data is transmitted to a single bundle, that bundle fuses the weather and then transmits the results to the others. In a decentralized arrangement, all data is transmitted to all bundles and then each bundle performs its own fusion. A GPS receiver is not required for this. In a decentralized approach, each package would query data sources and perform computation onboard without sharing information with other packages. In a centralized approach, one package would query data sources, perform onboard computations, and share the results with other packages. The computations and measurement burdens may be split among multiple packages; however, a single overall result would be obtained and shared among all packages.

Faults and failures are common in airdrop. By allowing each package to perform its own wind data fusion to estimate the wind field, the entire system is less likely to fail than by designating a single package or CPU to perform the fusion and communicating a wind estimate to other packages in a drop. Nevertheless, a centralized approach is feasible and slightly less expensive than a decentralized approach; however, it is less robust to faults and uncertainties than a decentralized approach.

Release of guided parafoils immediately prior to a ballistic airdrop has the potential to supply timely wind estimates to the ballistic packages that can be used to compute optimal transition altitudes. The guided parafoils can act as smart dropsondes that not only hit their targets with extreme accuracy, but also provide a source of wind data that can improve the accuracy of the less expensive ballistic packages that follow. It is important to extract wind data from the closed loop trajectories of the guided parachutes. Knowledge of the state and control time histories for the guided parafoils along with the equations of motion allows one to obtain such a wind estimate. The wind estimate would be transmitted via radio from the guided parafoils to the individual packages in the ballistic airdrop to be included as a component in the wind data fusion algorithm that runs onboard each ballistic package.

The general approach is not limited to systems with a single control event. It can also be applied to systems that may be influenced by multiple discrete control events. The approach of utilizing discrete control events to exploit what would otherwise be disturbances, has applications beyond airdrop. The advantage of the discrete control event approach is that it can be implemented with less hardware and cost than continuously guided approaches.

For airdrop and bombing, possible performance criteria include: minimization of impact error, multi-package impact dispersion minimization, distribution of packages to points closest to a road network, distribution to minimize time/effort for recovery, or perhaps maximization of dispersion area.

The approach is also applicable to both ascent and descent problems involving motion through moving fluids. An example would be a submarine drone that has discretely variable buoyancy that has knowledge of ocean currents that can be exploited to cause the drone to move toward a desired location. Balloons in the atmosphere could employ a similar principle. Given a disturbance field across a geographic area, it may be possible to plan a series of discrete control events for a variable buoyancy vehicle to pass over ground targets using very low cost and low complexity disposable hardware.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method for precision ballistic airdrop of one or more packages from an aircraft comprising:
    a) estimating a wind field in a drop zone and entering the estimated wind field into a CPU aboard each of the one or more packages;
    b) computing a transition altitude for each of the one or more packages based on the wind field and the order in which each package is released, the transition altitude being the altitude where a drogue chute is jettisoned and a main chute is deployed, each package having a predetermined release order;
    c) programming the computed transition altitude into each of the one or more packages;
    d) releasing each of the one or more packages in the predetermined order;
    e) comparing a pressure altitude to the transition altitude in the CPU of each package;
    f) jettisoning the drogue chute and deploying the main chute for each of the one or more packages when the pressure altitude is less than or equal to the transition altitude; and
    g) descending each of the one or more packages under its main chute, wherein the wind field affects the flight of some of the packages more than others based on the selection of the transition altitude for each package.

2. A method for precision ballistic airdrop of one or more packages from an aircraft comprising: The method for precision ballistic airdrop of one or more packages from an aircraft of claim 1, further comprising:
    distributing package contents among each of the packages to achieve maximum uniformity in descent rate.

3. A method for precision ballistic airdrop of one or more packages from an aircraft comprising: The method for precision ballistic airdrop of one or more packages from an aircraft of claim 1, further comprising:
    collecting package position information over time with a GPS unit onboard each package which is in communication with the CPU;
    re-computing the transition altitude for each package based on the GPS measurements.

4. A method for precision ballistic airdrop of one or more packages from an aircraft comprising: The method for precision ballistic airdrop of one or more packages from an aircraft of claim 1, further comprising:
    collecting pressure altitude information over time with a pressure altimeter onboard each package and in communication with the CPU;
    comparing the pressure altitude information to the computed transition altitude for each package.

5. A method for precision ballistic airdrop of one or more packages from an aircraft comprising: The method for precision ballistic airdrop of one or more packages from an aircraft of claim 1, further comprising:
    receiving wind field information in the CPU in each package through a radio receiver on each package;
    re-computing the transition altitude for each package based on the received wind field information.

6. A method for precision ballistic airdrop of one or more packages from an aircraft comprising: The method for precision ballistic airdrop of one or more packages from an aircraft of claim 1, further comprising:
    deriving wind field information in each CPU from GPS trajectory inputs.

7. A method for precision ballistic airdrop of one or more packages from an aircraft comprising: The method for precision ballistic airdrop of one or more packages from an aircraft of claim 6, further comprising:
    receiving wind field information from at least one of a lower package, an aircraft, and a ground-based wind field information source.

8. A method for precision ballistic airdrop of one or more packages from an aircraft comprising: The method for precision ballistic airdrop of one or more packages from an aircraft of claim 7, further comprising:
    re-computing the transition altitude for each package with the received wind field information.

9. A method for precision ballistic airdrop of one or more packages from an aircraft comprising: The method for precision ballistic airdrop of one or more packages from an aircraft of claim 6, further comprising:
    re-computing the transition altitude for each package with the derived wind field information.

10. A method for precision ballistic airdrop of one or more packages from an aircraft comprising: The method for precision ballistic airdrop of one or more packages from an aircraft of claim 1, further comprising:
    calculating the discrete transition altitude for each package based on at least one of calculated and measured performance characteristics of the drogue chute and the main chute.

11. A method for precision ballistic airdrop of one or more packages from an aircraft comprising: The method for precision ballistic airdrop of one or more packages from an aircraft of claim 1, further comprising:
    choosing a release heading for the aircraft to minimize initial dispersion of the bundle of packages and to maximize the effect of the wind field to affect the trajectories of the bundle of packages.

* * * * *